(12) United States Patent
Mevissen

(10) Patent No.: US 7,054,037 B1
(45) Date of Patent: May 30, 2006

(54) METHOD AND APPARATUS FOR DITHERING OR UNDITHERING DATA WORDS IN A DATA STREAM

(75) Inventor: Perry Gerard Mevissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1035 days.

(21) Appl. No.: 09/705,664

(22) Filed: Nov. 3, 2000

(30) Foreign Application Priority Data

Nov. 22, 1999 (EP) .................................. 99203906

(51) Int. Cl.
*G06K 15/00* (2006.01)
*H04N 1/405* (2006.01)

(52) U.S. Cl. .................... 358/3.08; 358/3.06; 358/3.01
(58) Field of Classification Search ................. 358/1.9, 358/3.07–3.08, 3.13–3.19, 525; 382/237, 382/260, 274
See application file for complete search history.

(56) References Cited

U.S. PATENT DOCUMENTS

| | | | |
|---|---|---|---|
| 5,164,717 A | 11/1992 | Well et al. .................. 340/793 |
| 5,184,124 A | 2/1993 | Molpus et al. ................ 341/50 |
| 5,367,299 A * | 11/1994 | Calamera ...................... 341/95 |
| 5,436,590 A * | 7/1995 | Simard et al. .............. 329/303 |
| 5,598,184 A | 1/1997 | Barkans ...................... 345/149 |
| 5,754,707 A | 5/1998 | Knowlton ................... 382/254 |
| 5,832,186 A * | 11/1998 | Kawana ...................... 358/1.9 |
| 6,101,285 A * | 8/2000 | Fan ............................. 382/260 |
| 6,222,950 B1 * | 4/2001 | Sugiura et al. ............. 358/1.9 |
| 6,347,160 B1 * | 2/2002 | Cheung et al. ............. 382/260 |
| 6,384,864 B1 * | 5/2002 | Kim ........................... 348/441 |

* cited by examiner

*Primary Examiner*—Thomas D. Lee
*Assistant Examiner*—James A Thompson

(57) ABSTRACT

Method and apparatus for dithering and undithering data words in a data stream. The method comprises the steps of processing a data word in a data stream to obtain an output data word by calculating (14) a first difference, calculating (16) a second difference, comparing (14, 16) the first difference and the second difference with a comparator value S, shifting left (12) the first data word with a first number of bits, the first number being equal to a shift value G minus one, and adding (18) an offset value D to the first data word only when both the first difference and the second difference are equal to the comparator value S. The apparatus comprises elements to perform the steps of the present method. The present method and apparatus allow using common steps, respectively elements to perform both dither and undither operations.

13 Claims, 3 Drawing Sheets

METHOD AND APPARATUS FOR DITHERING OR UNDITHERING DATA WORDS IN A DATA STREAM

TECHNICAL FIELD

The present invention relates to a method and apparatus for changing the number of bits of data words in a data stream, more generally known in the field as dithering and undithering. The method and apparatus can perform both a dither operation and an undither operation on a data stream, which may e.g. represent a digital video image.

BACKGROUND ART

American patent U.S. Pat. No. 5,754,707 describes an undithering method to convert a dithered representation of an image into a continuous tone representation of the image. The method compares regions of the dithered image with sections of dither patterns. When such a pattern is found, the corresponding part of the image is converted into the appropriate continuous tone representation. The regions of the dithered image may be formed by applying windows.

American patent U.S. Pat. No. 5,598,184 describes a method and apparatus for improved color recovery in a computer graphics system, in which color information lost due to encoding data by dithering is recovered by passing the encoded data through a filter that has the same effective shape and size as the dither matrix used to encode the data. Using this method, N bits of color information is recoverable from a data stream that has been dithered using a dither matrix of $2^N$ cells. This patent also discloses the manner in which a data stream representing an image is dithered, leading to a chessboard pattern in the resulting dithered data stream. For both the dither and undither method, the same number of pixels in the data stream are compared.

American patent U.S. Pat. No. 5,164,717 describes a method and apparatus for dithering of anti-aliased vectors. Dithered images are composited with separately undithered images. This method is specifically applied to the rendering of lines on computer graphic display devices. A vector to be displayed is first anti-aliased at a first resolution and is then composited with the corresponding background pixels of the digital image. Then, the pixel data output of the compositing process is dithered to a lower resolution for storage and display.

Thus far, no general methods or apparatus has been disclosed which can be used to perform both general dithering and undithering functions. Usually, for every application a dedicated dither function is implemented in either hardware or software, as well as a dedicated undither function.

An object of the present invention is to provide a method and apparatus for processing a data word in a data stream, such as a data stream representing a digital image, which is suitable to provide both a dithering and an undithering function. The present invention should provide a single interface between existing different data sizes (8-to-9, 5-to-8, 6-to-8 or 9-to-8 bits data sizes) in data streams, such as data streams representing a digital image. This will cover all the currently popular data sizes.

A secondary object of the present invention is to provide a dither function in which dithering is applied only to uniform and constant value parts of the data stream, in order to prevent distortion of edges or details.

SUMMARY OF THE INVENTION

According to one aspect of the present invention, a method is provided for dithering and undithering data words in a data stream, comprising the steps of processing a first data word in a data stream to obtain an output data word by calculating a first difference by subtracting the first data word from a second data word, calculating a second difference by subtracting the first data word from a third data word, comparing the first difference and the second difference with a comparator value S, shifting left the first data word with a first number of bits, the first number being equal to a shift value G minus one, and adding an offset value D to the first data word only when both the first difference and the second difference are equal to the comparator value S.

By using this method, it is possible to provide both a dither function and an undither function, i.e. it is possible to both reduce the number of bits per data word in a manner which is restorable, and to enlarge the number of bits per data word to the original number of bits.

In a further embodiment, the shift value G is equal to or greater than one, the comparator value S is equal to one, and the method further comprises the steps of subtracting an offset value D from the first data word when both the first difference and the second difference are equal to the negative comparator value S. Preferably, the offset value D is chosen equal to $2^{G-1}$. This embodiment enables an undither function, restoring the number of bits per data word to the original number before dithering.

In a preferred embodiment, the first data word is a current data word in the data stream; the second data word is a previous data word in the data stream; the third data word is a succeeding data word in the data stream. In this way, a toggling least significant bit of data words in a data stream can be detected and restored to its original format.

In a further preferred embodiment, the method is adapted to the dither function, that is to reduce the number of bits of each data word in a data stream in a recoverable manner. In this embodiment, the comparator value S is equal to zero, the shift value G is equal to zero, the offset value D is equal to one, and the second data word is equal to the output data word after performing a shift right operation with the first number of bits and an addition operation adding a value of one. Preferably, the first data word is a current data word in the data stream and the third data word is a succeeding data word in the data stream, resulting in a word-by-word application of the dither function. The inherent feedback loop of this embodiment generates a toggling pattern in the data stream, and also ensures that, when the data stream represents an image, dithering is only applied to image content in which no detailed information, such as edges or image details, is present. As a result, no distortion of edges or image details occurs.

When the data stream represents a two dimensional image formed by multiple lines of data words a further embodiment is envisaged. In this embodiment the step of adding an offset value D to the first data word when both the first difference and the second difference are equal to the comparator value is applied in phase with a pixel frequent toggling signal for a first one of the multiple lines of data words and in opposite phase with the pixel frequent toggling signal for a second one of the multiple lines of data words. In this manner a chessboard pattern will be generated in the image, visually hiding the dither pattern. For progressive line scanned images (such as VGA computer images), the first one and second one of the multiple lines of data words are successive lines. For interlaced images, the first one and second one of the multiple lines of images are one field (half image) apart.

The dither and undither operations of the methods according to the present invention can be repeatedly applied without increasing distortion or loss of quality.

By using common functionality and a limited number of parameters (shift value G, offset value D and comparator value S, the present method may provide both a dither and an undither function. Using common functionality enables a very efficient way of implementing the present method in both hardware and in software. The present method can be effectively and advantageously be applied to digital TV signals, but also in other applications, such as audio data streams.

In a second aspect, the present invention relates to a computer program, which after it has been loaded into a computer system, provides the computer system with the functionality of the present method. The computer system may be a general purpose computer, or e.g. a specialised video processing computer.

A third aspect of the present invention relates to an apparatus for dithering and undithering data words in a data stream. The apparatus is arranged to process a first data word in the data stream to obtain an output data word, the apparatus comprising first, second and third buffers for storing a first, second, and third data word, respectively, first calculation means, connected to the first and second buffer, for calculating a first difference by subtracting the first data word from a second data word, second calculation means, connected to the first and third buffer for calculating a second difference by subtracting the first data word from a third data word, first comparator means, connected to both the first and second calculation means, for comparing the first difference and the second difference with a comparator value S, first shift means for shifting left the first data word with a first number of bits, the first number being equal to a shift value G minus one, and first addition means for adding an offset value D to the first data word, the first addition means being operative only when both the first difference and the second difference are equal to the comparator value S.

For the undither operation of the present apparatus, the apparatus further comprises second addition means for subtracting an offset value D from the first data word when both the first difference and the second difference are equal to the negative comparator value S.

For the dither operation of the present apparatus, the apparatus further comprises loop back means, arranged to couple the output data word back to the third buffer, after performing a shift right operation with the first number of bits and an addition operation adding a value of one.

To enable the phase control mode of the dither operation, the apparatus further comprises phase control means providing a pixel frequent toggling signal to control the first addition means in such a way, that when the data stream represents a two dimensional image formed by multiple lines of data words the first addition means are enabled in phase with the pixel frequent toggling signal for a first one of the multiple lines of data words and in opposite phase with the pixel frequent toggling signal for a second one of the multiple lines of data words.

DETAILED DESCRIPTION OF PREFERRED EMBODIMENTS OF THE PRESENT INVENTION

Figure 1:
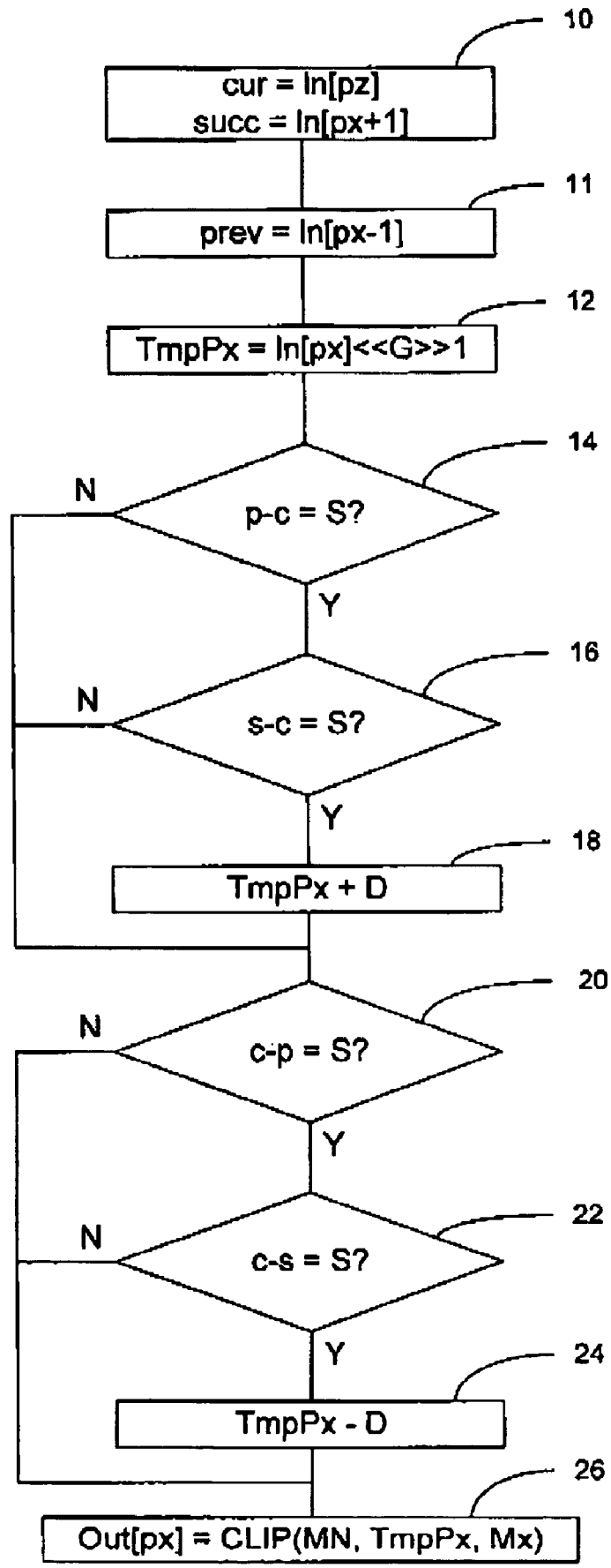
FIG. 1 shows a flow diagram of the undither mode of the method according to the present invention.

As video processing applications evolve, more and more different data-sizes occur. Integrated circuits become smaller and faster so the number of bits used to represent picture data tend to grow in order to increase accuracy. With the introduction of PICNIC (SAA4978), 9-bits samples were introduced next to the existing 8-bits samples. In order to be compatible with other ASICs that only have 8 bits and without completely losing the extra LSB, a dedicated dither and a dedicated undither function were developed that virtually encodes and restores the $9^{th}$ bit.

Besides standard video also pictorial data from the PC comes into the picture with its VGA standard. Introducing (next to the 8- and 9-bit format) a 5- and a 6-bit format coming from so called 16-bit high-color mode where R,G and B are represented by 5, 6 and 5 bits respectively. Also the VGA standard is familiar with dithering operations.

The method and apparatus according to the present invention can interface between all these different data sizes. It is weakly programmable with only a few parameters. If the basic data size is N then data-sizes of N−1 to N+x can be output. In a most preferred embodiment, the application target is to implement the method or apparatus with x=3 in order to go from 8-to-9, 5-to-8, 6-to-8 or 9-to-8 bits data sizes. This will cover all the currently popular data sizes. All this can be done with the one function according to the present invention.

Going to smaller data-sizes is limited to N-1 because only 1 LSB can be properly encoded into its left neighbour. If more data size reduction is desired, then normal rounding is best applied just before using the present method. Example: (from 10 to 8); first round from 10 to 9 bits and then use the present method to go from 9 to 8 bits.

The goal of the dithering mode of the method of the present invention is to cause the least significant bit of the pixels in the data stream to toggle on uniform and constant picture parts only in horizontal direction. In this way, no distortion occurs on edges of image elements. The dithering operation causes a certain pattern in the pixel values of the data stream, and this certain pattern can be recognised to allow restoration of the original signal, i.e. an undither operation.

In an embodiment, values of pixels that lay just one bit beyond the quantization level are represented by making a pixel frequent toggling on the least significant bit after reducing the number of bits per pixel. To recognise the pattern caused by this dithering operation, three pixel values need to be compared, e.g. three consecutive pixels in a data stream.

The undither mode of the present method adds a number of bits to each data word of a data stream, in order to restore the number of bits per data word to the original number before dithering has been applied. For this, the data stream is searched for a certain pattern, caused by the dither operation, e.g. by comparing the respective values of three consecutive pixels. When such a pattern is found, the current pixel value is restored to the original value of the pixel before dithering.

First, the undither mode of the method according to the present invention will be described with reference to FIG. 1, which shows a flow diagram of the undither mode.

The method starts with an initialising block 10 in the undither mode, initialising two of the three pixel values which are to be compared. In the embodiment shown, the two pixels are the current and succeeding pixel in a serial data stream, which e.g. forms a digital TV data stream. In block 11, a third pixel value is initialised, which in the case of the undither mode is the previous pixel in the data stream.

In the block 12, a variable TmpPx obtains the value of the current pixel, after being shifted left with G bits, G being a shift value, and shifted right with one bit. The resulting pixel TmpPx thus has a number of bits that is G−1 bigger than the current pixel.

In the next blocks the three pixel values (previous, current, succeeding) are compared with each other to establish whether a dither pattern exists in that portion of the data stream.

In blocks 14, 16, a first difference of the previous pixel value and the current pixel value, respectively a second difference of the succeeding pixel value and the current pixel value, is compared to a comparator value S. When both the first difference and the second difference are equal to the comparator value S, an offset value D is added to the variable TmpPx in block 18.

In blocks 20, 22, negative equivalents of the first and second differences are calculated. A third difference of the current pixel value and the previous pixel value, respectively a fourth difference of the current pixel value and the succeeding pixel value, is compared to a comparator value S. When both the third difference and the fourth difference are equal to the comparator value S, an offset value D is subtracted from the variable TmpPx in block 24.

By properly choosing the comparator value S, parameters shift value G, and offset value D, a proper functioning undither mode of the method is accomplished. The goal of dithering of pixels in a data stream is that values that lay just one bit beyond the quantization level can be optically represented by making a pixel frequent chessboard on the least significant bits of the pixels (or to toggle subsequent pixels in a serial data stream). The original data stream can then be restored by comparing subsequent pixels with the comparator value S, which in the undither mode should be taken to be '1'.

If both the previous and the succeeding pixel are exactly 1 bigger than the current pixel an offset of +1 should be added to the current pixel after having shifted it to the left one bit, i.e. G=2 and D=1. This is also done with an offset of −1 when both mentioned pixels are 1 less than the current pixel.

When the output pixel has to be 2 bits bigger then 2 bits are shifted left and offsets of +2 and −2 are used, i.e. G=3 and D=2.

When the output pixel has to be 3 bits bigger then 3 bits are shifted left and offsets of +4 and −4 are used, i.e. G=4 and D=4.

For transparency (no alteration on the number of bits per pixel) no shift left should be done and the offsets should be set to 0, i.e. G=1 and D=0. In this case, the comparator value S is not of interest.

As a final operation, the output of the undither mode of the present embodiment is determined by performing a clipping operation on the variable TmpPx in block 26, in order to limit the value of the output between a minimum and maximum value.

With reference to the flow diagram in FIG. 2, the dither mode of the method according to the present embodiment will be discussed. The goal of the dithering mode of the method of the present invention is to cause the least significant bit of the pixels in the data stream to toggle on uniform and constant picture parts only in horizontal direction. In this way, no distortion occurs on edges of image elements.

The method in the dither mode also starts with initialisation block 10, initialising two of three pixel values that are to be compared. In the embodiment shown, the succeeding and current pixels are initialised similarly as in block 10 in the undither mode, i.e. from the data stream input. However, the previous pixel is initialised in block 28 by a return loop using the output pixel of the previous clock step. In block 28, an operation is performed on the output pixel to restore it to the input format of the input data stream, i.e. prior to the dithering operation, but only when the original input pixel had an odd value. This is accomplished in block 28, in which the output pixel is first shifted left one bit and then right with G bits, G being the shift value. In the case of the dither mode, G should be equal to 0, effectively causing that the output pixel is shifted left with one bit, or that the number of bits per pixel is increased by one. After that, a value of '1' is added, so that only odd pixel values that did not get dithered are exactly restored. If the previous pixel was dithered or the area being dithered is of even pixel values the restored previous pixel will never match.

In a next step (block 12, with an equal reference sign as in the flow diagram of FIG. 1 as it is functionally the same), the current pixel is shifted left G bits and right one bit. In the case of the dither mode the shift value G is set at a value of 0, resulting in that the current pixel is shifted right one bit, effectively reducing the number of bits per pixel by one.

Dithering an even value is not needed for it can be represented exactly with one bit less. Dithering an odd value is wanted if, and only if, the previous pixel was not dithered. This is accomplished by the decision blocks 14, 16 and block 18 (also with equal reference signs as in FIG. 1 with reference to the undither mode).

In blocks 14, 16, again a first difference of the previous pixel value and the current pixel value, respectively a second difference of the succeeding pixel value and the current pixel value, is compared to a comparator value S. When both the first difference and the second difference are equal to the comparator value S, an offset value D is added to the variable TmpPx in block 18. However, in the case of the dither mode, the comparator value S is set at '0', in order to detect constant and uniform pixel sequences.

Also, in the embodiment shown, the output of the dither mode of the present embodiment is determined by performing a clipping operation on the variable TmpPx in block 26, in order to limit the value of the output between a minimum and maximum value.

Figure 2:
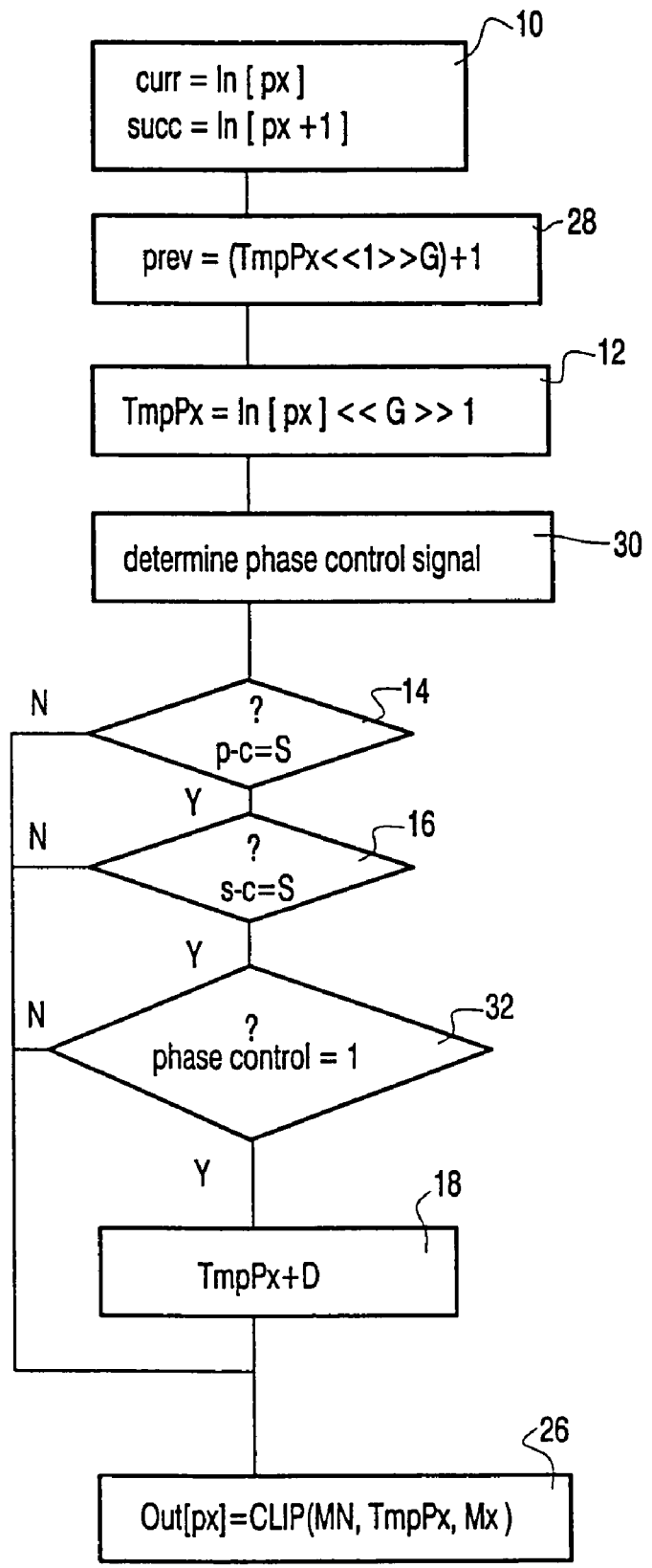
FIG. 2 shows a flow diagram of the dither mode of the method according to the present invention.

As can be seen from FIGS. 1 and 2, a large number of blocks in the flow diagram for the undither mode (blocks 10, 12, 14, 16, 18 and 26) may also be used in the flow diagram for the dither mode, by using a limited number of parameters (shift value G, offset value D and comparator value S). This allows very efficient programming for a software implementation of the method according to the present invention, allowing both an undither mode of operation and a dither mode of operation.

In a preferred embodiment, the flow diagram comprises two additional blocks, as shown in FIG. 2, enabling use of a phase control to ensure a chessboard pattern in a dithered data stream representing a two dimensional image, such as an interlaced TV image. Between block 28 and decision block 14, an additional block 30 is present, determining a phase control signal. After decision block 16 and before block 18, an additional decision block 32 is positioned. These additional blocks 30 and 32 are used to ensure a chessboard pattern in the output data stream, when the data stream represents a two dimensional image.

Additional block 30 determines a phase control signal, to be used in additional decision block 32. The phase control signal may be a 2 bit signal, of which the most significant bit is used to disable the additional decision block 32, allowing a 'free run' mode of operation of the dither mode in which the dithering is always applied to uniform and constant sequential pixels.

Setting the phase control signal to '0' or '1' forces the dither pattern into its corresponding phase. The phase control signal will cause the decision of the decision blocks 14 and 16 to reach block 18 or not. If the decision regarding an odd pixel value was denied to be dithered, additional decision block 32 will decide to dither the next pixel.

Specially for graphics the phase enforcement visually hides the dither pattern. For progressive scanned images the phase control signal should alternate line-frequent. For interlaced images the phase control signal should alternate field-frequent. Horizontal details and edges in the picture content will not be distorted by the dither function, as it is implicitly locally adaptive.

The above described method can easily be implemented in software, an embodiment of which follows in the generally familiar C programming language.

```
#include "types.h"
#define UNDITHER 0
#define DITHER 1
void Viper (line In, aperture *ap, vipar *vp, line Out)
{
looper px;
short prev, cuff, succ; /* pixelbuffers */
short TmpPx;
int G,S,D,P,MX,MN; /* controls */
char chessbrd;    /* forces phase of dither on chessboard */
G = vp->growth[0];
S = vp->search[0];
D = vp->delta [0];
P = vp->phase;
MX= vp->maxout[0];
MN= vp->minout[0];
for (px=0; px < ap->nrpx; px++) {
if(vp->mode[0]==0) prey = (px-1 < 0     ) ? (0): (In [px-1]);
else       prey = (px-1 < 0     ) ? (0): (TmpPx << 1 >>G)+1;
curr =        (In[px ]);
succ = (px+1 >= ap->nrpx) ? (0): (In[px+1]);
TmpPx = (In[px] <<G>> 1);
chessbrd = (vp->phase>=2) ? (1): (vp->phase^(px%2));
if(((prev-curr)==S)&&((succ-curr)==S))
  if(chessbrd||vp->mode[0]==UNDITHER) TmpPx +=D;
if(((curr-prev)==S)&&((curr-succ)==S)&&(vp->mode[0]==UNDITHER))
TmpPx -=D;
Out[px] = CLIP(MN, TmpPx, MX);
}
}
```

Figure 3:
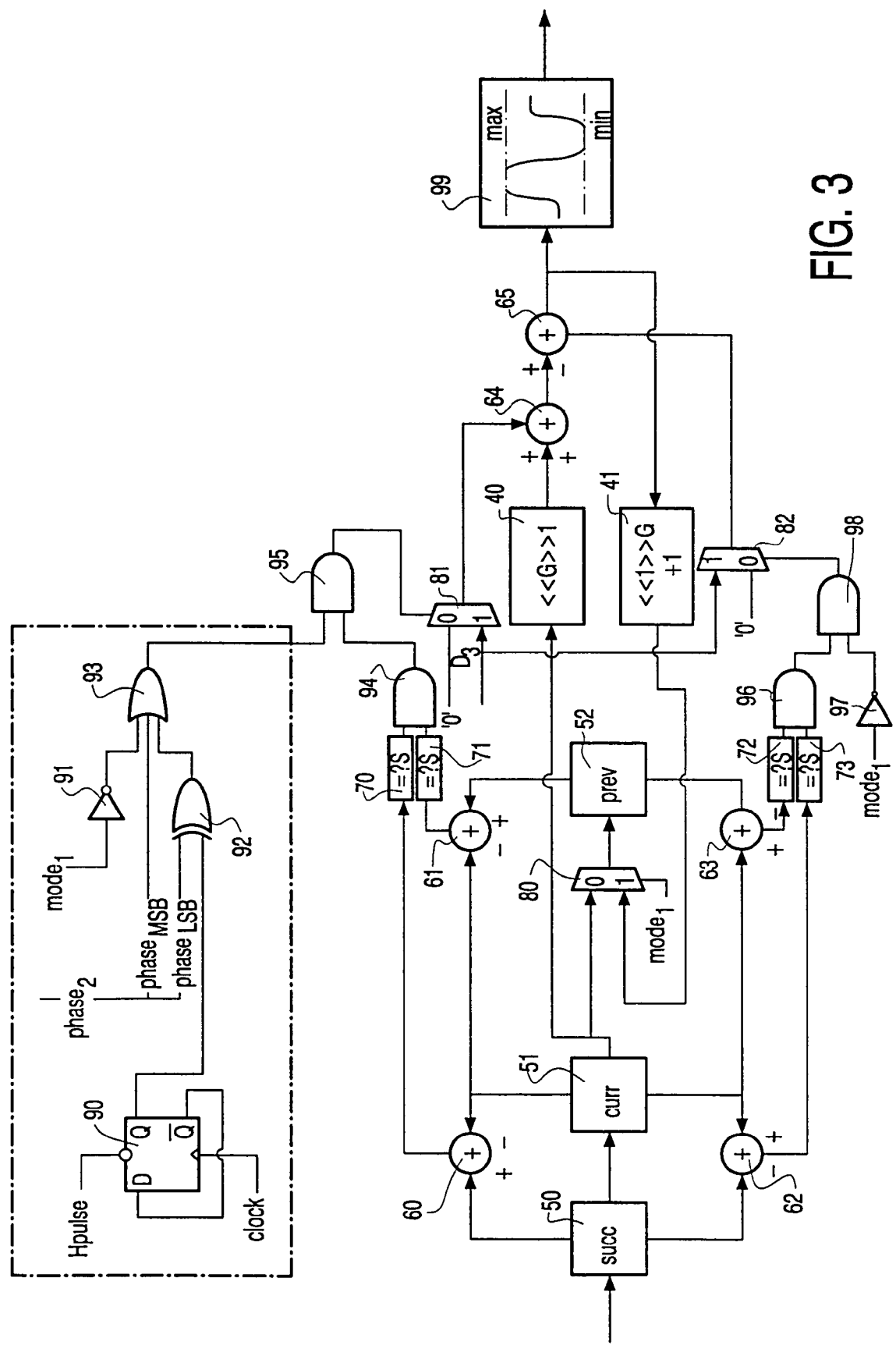
FIG. 3 shows a circuit diagram of a hardware implementation of the method according to the present invention.

According to the present invention, the method for dithering and undithering can advantageously be implemented in hardware comprising e.g., a digital circuit. The digital circuit comprises buffers, adders, comparators and multiplexers and a number of further logical elements, as schematically represented in FIG. 3. In FIG. 3, a number of signals are referred to with a suffix, the suffix indicating the number of bits of the signal.

The operation of the apparatus is controlled by means of a limited number of parameters. The one bit 'mode' signal indicates whether the dither function (mode='1') or the undither function (mode='0') is used. The routing of the digital circuit is controlled by the mode signal by means of a first multiplexer 80, a first inverter 91, a three gate OR gate 93, a second inverter 97 and AND gates 95 and 98.

Additionally, three parameters are used as described above, comprising a shift value G (in bits), a comparator value S and an offset value D.

Referring to FIG. 3, the elements used for the undither function are discussed firstly. The digital circuit comprises a first buffer element 50, storing the succeeding pixel (succ) of a data stream, a second buffer element 51, storing the current pixel (curr) of a data stream and a third buffer element 52, storing a previous pixel (prev) of a data stream.

The output of the first buffer 50 is connected to the second buffer 51, to a positive input of a first addition element or adder 60 and to a negative input of a third adder 62. The output of the second buffer 51 is connected to a negative input of the first adder 60, a negative input of a second adder 61, a positive input of the third adder 62 and a positive input of a fourth adder 63. Also, the output of the second buffer is connected to a first shift element 40 and a first input of the first multiplexer 80. The output of the first multiplexer 80 is connected to an input of the third buffer 52. The multiplexer 80 is arranged to connect its output to the first input when the mode signal equals '0' (undither function), effectively connecting the output of the second buffer 51 with the input of the third buffer 52. The output of the third buffer 52 is connected to a positive input of the second adder 61 and a negative input of the fourth adder 63.

The first adder 60 outputs a first difference value by subtracting the value of the current pixel from the value of the succeeding pixel and the second adder 61 outputs a second difference value by subtracting the value of the current pixel from the value of the previous pixel. A first comparator 70 is connected to the output of the first adder 60 and compares the first difference value with the comparator value S. Likewise, a second comparator 71 is connected with the output of the second adder 61 and compares the second difference value with the comparator value S. The results of the first and second comparator 70, 71 are combined by means of an AND gate 94.

The third adder 62 outputs a third difference value by subtracting the value of the succeeding pixel from the value of the current pixel and the fourth adder 63 outputs a fourth difference value by subtracting the value of the previous pixel from the value of the current pixel. The third and fourth difference values are thus the negative values of the first and second difference values, respectively. A third comparator 72 is connected to the output of the third adder 62 and compares the third difference value with the comparator value S. Likewise, a fourth comparator 73 is connected with the output of the fourth adder 63 and compares the fourth difference value with the comparator value S. The results of the third and fourth comparator 72, 73 are combined by means of an AND gate 96.

The output of AND gate 94 is connected to a control input of a second multiplexer 81 via AND gate 95 (to be discussed later). A signal with a value '0' and a signal with a three bit value D are provided to the inputs of the second multiplexer 81. The second multiplexer 81 is arranged in such a way, that the output of the second multiplexer 81 represents a value '0' when either the first comparator 70 or the second comparator 71 provides a negative result, and a value D when both the first comparator 70 and second comparator 71 provide a positive result.

Likewise, the output of AND gate 96 is connected to a control input of a third multiplexer 82 via AND gate 98 (to be discussed later). A signal with a value '0' and a signal with a value D are also provided to the inputs of the third multiplexer 82. The third multiplexer 82 is arranged in such a way, that the output of the third multiplexer 81 represents a value '0' when either the third comparator 72 or the fourth comparator 73 provides a negative result, and a value D when both the third comparator 72 and fourth comparator 73 provide a positive result.

The value of the current pixel in the second buffer 51 is provided to an input of the first shift element 40, which executes a left shift of G bits and a right shift of one bit. The current pixel is thus enlarged with G−1 bits. The output of the shift element 40 is connected to a fifth adder 64. The output of the fifth adder is connected to an input of a sixth adder 65

To the value of the current pixel at the output of the first shift element 40, a value of D, 0 or −D is added dependent on the results of the first, second, third and fourth comparator 70.73.

In an embodiment, the output of the sixth adder 65 is connected to a clipping element 99, which limits the output signal to a value between a minimum and maximum value.

For the undither function, the apparatus uses a comparator value S equal to '1'. If the value of both the previous and the succeeding pixel are exactly 1 bigger than the value of the current pixel, an offset value of +1 should be added to the current pixel after having shifted it to the left one bit. This is also done with an offset of −1 when both mentioned pixels are 1 less than the current pixel. This is accomplished by setting the offset value D to 1 and the shift value G to 2. When the output has to be 2 bits bigger, the shift value G is set to 3 and the offset value D to 2. When the output has to be 3 bits bigger, the shift value G is set to 4 and the offset value D is set to 4.

In the undither mode, it is also possible to pass data as is in a so-called transparant mode, leaving the number of bits per pixel unchanged. In this case, the shift value G is set to 1, effectively causing no shift in the first shift element 40, and the offset value D is set to 0. The comparator value S is of no importance in this case.

For the dither function of the apparatus according to the present invention, a large number of element are used which are also used for the undither function.

In this case, the routing of signals in the digital circuit is changed by means of the mode signal and the first multiplexer 80, inverter elements 93, 97 and AND gates 95 and 98.

When operating in dither mode, the mode signal is set to 1, effectively causing the first multiplexer 80 to switch and engage a return loop. The inverter 97, the output of which is connected to an other input of AND gate 98, effectively causes the lower half of the digital circuit, comprising the third and fourth adder 62, 63, the third and fourth comparator 72, 73 and AND gate 96, to be inoperative. The mode signal is also provided to the inverter 91, of which the output is connected to an input of OR gate 93. In dither mode (mode signal '1'), the output of the inverter 91 will be low, effectively causing the output of OR gate 93 to be dependent on its other two inputs.

The return loop provides the output signal (as present at the input of clip element 99) to the input of a second shift element 41, which shifts the signal left with one bit, shifts it right with G bits and adds a value of 1. Effectively, the second shift element restores exactly and only originally odd values of the current pixel that did not get dithered. If the previous pixel was dithered or the area being dithered is of even pixel values the restored previous pixel will never match. Dithering an even value of the current pixel is not needed as it can be represented exactly with one bit less, as effected by the first shift element 40. Dithering an odd value is wanted only if the previous pixel was not dithered, which is established by the first and second comparators 70, 71.

With correct settings of the shift, offset and comparator values this return loop implicitly causes the LSB of the output to toggle on odd, uniform and constant image parts only in a horizontal direction.

In the preferred embodiment shown in FIG. 3, the digital circuit also comprises a phase control block, comprising a negatively back coupled D-flipflop 90, arranged as a divider by 2, of which the output is connected to one of the inputs of an EXOR gate 92.

The phase control block can be used to ensure a chessboard pattern when the data stream represents an image, such as a TV- or VGA-image. The phase control block is controlled by a two bit phase signal (phase), of which the most significant bit is provided to an input of the 3-port OR gate 93, and the least significant bit is provided to an input the EXOR gate 92. Setting the phase signal to '2' or '3' (most significant bit=1) disables the phase enforcement and lets the dither pattern run free, depending on the picture content only, by providing a high signal to the input of AND gate 95.

Setting the phase signal to '0' or '1' forces the dither pattern into its corresponding phase. The negative back-coupled D-flipflop 90 functions as a clock divider with a factor 2. So a pixel frequent toggling signal is generated. Resetting the D-flipflop 90 by means of a horizontal pulse of the video signal guarantees the signal to always have the same phase with respect to the picture. The EXOR-gate 92 operates as an enabled-inverter. Depending on the least significant bit of the phase signal it will invert the pixel frequent signal. The most significant bit of the phase signal is '0', and therefore the (inverted) pixel frequent signal will either grant or deny (by means of AND-gate 95) the result of the comparators 70, 71 to the control input of the second multiplexer 81 to dither the current pixel. If an odd pixel was denied to be dithered the comparators will decide to dither again the next pixel. At that time, the pixel frequent toggling signal has toggled and will grant the comparators decision. As a result, the dither pattern is locked to the toggling signal. The pixel frequent toggling signal can be influenced with the phase signal to get a chessboard pattern.

The digital circuit as described above may be realised in an ASIC, providing a versatile integrated circuit for dithering/undithering applications, in which only a few parameters have to be used to control the detailed functioning of the ASIC, i.e. 9-to-8-bit dithering or 5-to-8, 6-to-8 or 8-to-9 bit undithering.

Specially in the case of the data stream representing a graphics image, the phase enforcement visually hides the dither pattern. For progressive scanned images (e.g. VGA computer images) the phase signal should alternate linefrequent. For interlaced images (e.g. TV images) the phase should alternate field-frequent. Horizontal details and edges in the picture content will not be distorted by the dither function, as the dither function is implicitly local adaptive.

It will be clear to the person skilled in the art, that many modifications and variations are conceivable for the method and apparatus according to the present invention. The embodiments described only represent examples of the invention, the scope of which is determined by the claims as attached.

The invention claimed is:

1. A method for dithering and undithering data words in a data stream, comprising the steps of processing a first data word in a first buffer in a data stream to obtain an output data word by:
   calculating a first difference by subtracting the first data word from a second data word in a second buffer;
   calculating a second difference by subtracting the first data word from a third data word in a third buffer;
   comparing the first difference and the second difference with a positive comparator value +S;
   shifting to the left the first data word with a first number of bits, the first number being equal to a shift value G minus one; and
   adding an offset value D to the first data word only when both the first difference and the second difference are equal to the positive comparator value +S.

2. The method according to claim 1, in which the shift value G is equal to or greater than one, the positive comparator value S is equal to one, and the method further comprises the steps of subtracting an offset value D from the first data word when both the first difference and the second difference are equal to a negative comparator value −S.

3. The method according to claim 2, in which the offset value D is chosen to be equal to $2^{G-1}$.

4. The method according to claim 2, in which the first data word is a current data word in the data stream; the second data word is a previous data word in the data stream; and the third data word is a succeeding data word in the data stream.

5. The method according to claim 1, in which the comparator value S is equal to zero, the shift value G is equal to zero, the offset value D is equal to one, and the second data word is equal to the output data word after performing a shift right operation with the first number of bits and an addition operation adding a value of one.

6. The method according to claim 5, in which the first data word is a current data word in the data stream and the third data word is a succeeding data word in the data stream.

7. The method according to claim 5, in which the data stream represents a two dimensional image formed by multiple lines of data words, and the step of adding an offset value D to the first data word when both the first difference and the second difference are equal to the comparator value is applied in phase with a pixel frequent toggling signal for a first one of the multiple lines of data words and in opposite phase with the pixel frequent toggling signal for a second one of the multiple lines of data words.

8. The method according to claim 1, in which the output value of the second data word is limited between a minimum value and a maximum value.

9. A computer program comprising a code that, after downloading into a computer system, will enable the computer system to perform the method according to claim 1.

10. An apparatus for dithering and undithering data words in a data stream, arranged to process a first data word in the data stream to obtain an output data word,
   the apparatus comprising:
   first, second and third buffers for storing a first, second, and third data word, respectively;
   first calculation means, connected to the first and second buffer, for calculating a first difference by subtracting the first data word from a second data word;
   second calculation means, connected to the first and third buffer for calculating a second difference by subtracting the first data word from a third data word;
   first comparator means, connected to both the first and second calculation means, for comparing the first difference and the second difference with a positive comparator value +S; and
   first shift means for shifting to the left the first data word with a first number of bits, the first number being equal to a shift value G minus one;
   first addition means for adding an offset value D to the first data word; and
   the first addition means being operative only when both the first difference and the second difference are equal to the positive comparator value +S.

11. The apparatus according to claim 10, further comprising second addition means for subtracting an offset value D from the first data word when both the first difference and the second difference are equal to a negative comparator value −S.

12. The apparatus according to claim 10, further comprising loop-back means, arranged to couple the output data word back to the third buffer, after performing a shift-right operation with the first number of bits and an addition operation adding a value of one.

13. The apparatus according to claim 12, further comprising phase control means providing a pixel frequent toggling signal to control the first addition means in such a way, that when the data stream represents a two-dimensional image formed by multiple lines of data words the first addition means are enabled in phase with the pixel frequent toggling signal for a first one of the multiple lines of data words and in an opposite phase with the pixel frequent toggling signal for a second one of the multiple lines of data words.

* * * * *